United States Patent Office

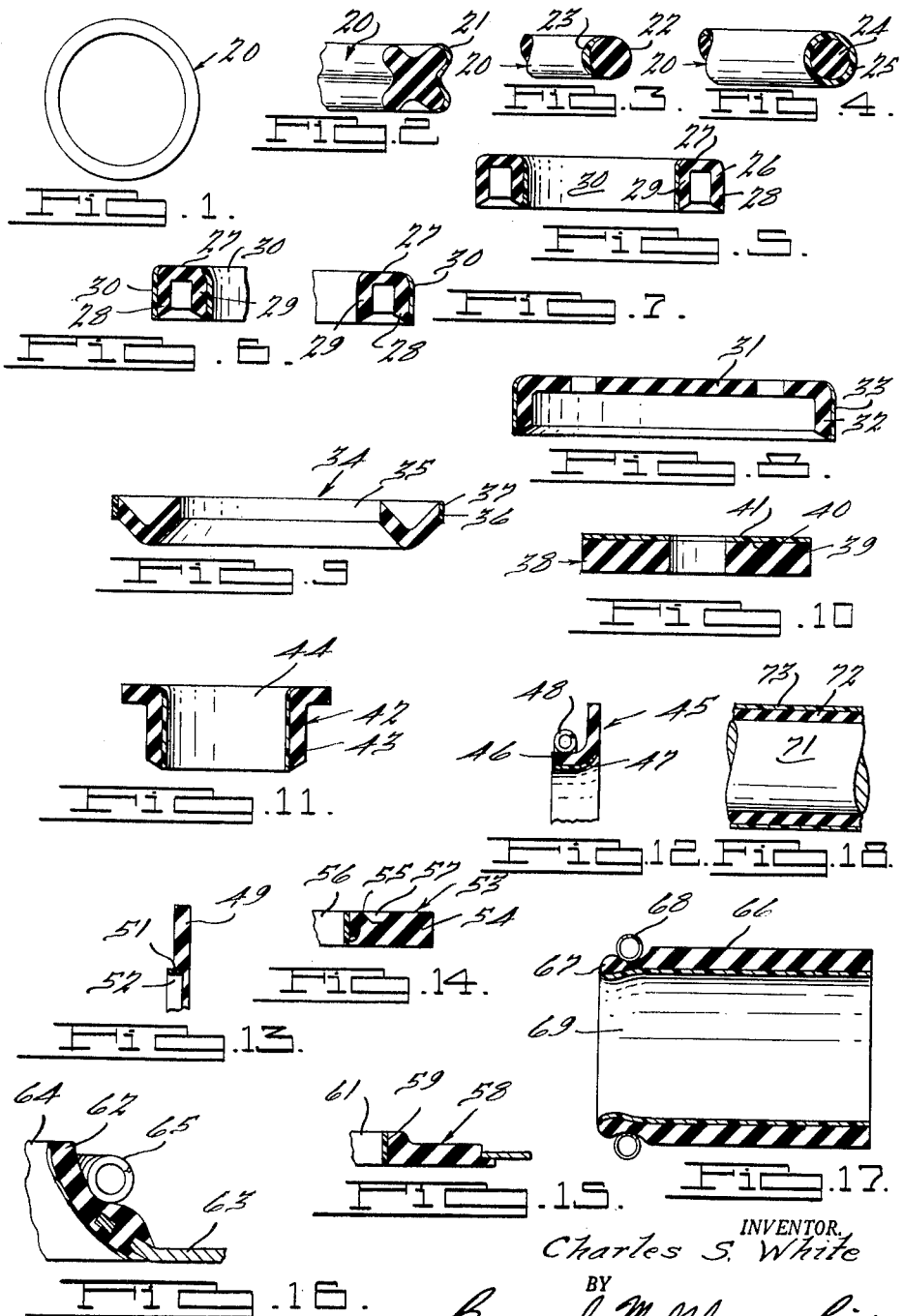

3,239,281
Patented Mar. 8, 1966

3,239,281
SEALING AND BEARING DEVICE HAVING
LOW FRICTION SEALING FACES
Charles S. White, 35826 41st St., Palmdale, Calif.
Application Aug. 11, 1959, Ser. No. 833,012, now Patent No. 3,097,893, dated July 16, 1963, which is a division of application Ser. No. 544,944, Nov. 4, 1955, now Patent No. 2,906,552, dated Sept. 29, 1959. Divided and this application June 5, 1963, Ser. No. 285,706
1 Claim. (Cl. 308—4)

This invention relates to seals, bearings and pistons, and particularly to seals, bearings and pistons having a low friction sealing face thereon, and is a division of copending application, Serial No. 833,012, filed on August 11, 1959, now U.S. Patent 3,097,393, which was a division of application Serial No. 544,944, filed November 4, 1955, now Patent 2,906,552.

The present invention particularly applies to seals, bearings and pistons for moving members having an engaging or working face which has low friction characteristics. When employing the elastomeric materials of the seal body for directly engaging the moving member, the employed pressure was high to prevent leaks, resulting in high friction and the deterioration of the material of the seal body and damage to the surface of the engaged part.

The present invention pertains to the use of the low friction material in fiber form, maintained in fixed position on the body material of the seal. Such fibers have a tensile strength substantially greater than the material when in sheet or block form, in some instances being as much as twenty-five times greater. The fibers may be uniformly distributed and directly engaged and bonded to the body material by cohesion or adhesion directly or by the use of a known bonding agent, depending on the material of the fibers and that of the body material. It was found that the fibers were more easily applied when woven in fabric form. Thus, a woven fabric of nylon in flat and sleeve form is directly bondable to the flat or annular working face of the rubber seal body. While nylon and other plastics have varying low friction properties and are desirable because of their low cost, still others have much lower friction characteristics.

The bonding characteristics of the fibers of the plastic materials appear to decrease as the friction characteristics decrease, so that the most desirable materials in fiber form completely lack bonding characteristics and are impossible to secure to the body material by known bonding methods. To overcome this difficulty and permit the use of the most desirable plastic fibers having the lowest friction characteristics, these fibers are woven into a compound fabric having a working face of low friction fibers and a backing face of bondable fibers. Thus, the low friction face may be applied to a fabric having a bondable back face, to the face of a webbing material if body is desired back of the low friction face, or to the inner or outer side of a fabric in sleeve form, with the opposite side having the bondable face. When not subjected to high heat and pressure, fibers having higher friction characteristics, which of themselves have bonding properties and which are much lower in cost, as mentioned above, may be utilized and bonded directly to the body material. When the compound fabric is employed, the fibers are evenently disposed and adjacently supported so as to provide a continuous surface on the backing layer which retains the fibers against movement when bonded to the body material.

Primarily the invention pertains to known types of seals to which fabric of low friction fibrous material is applied to the face which engages the moving part whether in rotation or reciprocation, or both. The body of the seal is preferably made of elastomeric material and the fabric is loose woven so that it will expand or contract with the material of the body and be urged under pressure into sealing relation with the moving part. The fabric may be in flat form when placed upon a flat surface which is engaged by the end of a moving part, such as on a thrust washer type of seal, and is in the form of a sleeve when secured to the inner or outer annular surface or to both the inner and outer annular surface of the seal. When the low friction type of fibers are employed which do not readily bond to the elastomeric material of the body, then the fabric is of the compound type above mentioned which is more specifically illustrated, described and claimed in the copending application of C. S. White, Serial No. 544,945, filed November 4, 1955, for Low Friction Fabric Material, and now Patent No. 2,804,886, issued on September 3, 1957.

Accordingly, the main objects of the invention are: to provide a seal which effectively withstands the high speed operation of the engaged part in the presence of high pressures which maintain a sealing engagement; to provide a layer on the face of a seal body which engages the operating part with the layer having low friction characteristics and which is integrally bonded to the material forming the body of the seal; to bond a fabric made of fibers having low friction characteristics to the engaging portion of a seal in unit relation thereto, and, in general, to form a seal having an engaging face of low friction characteristics which is simple in construction, positive in operation, and economical of manufacture.

Other objects and features of novelty of the invention will be specifically pointed out or will become apparent when referring, for a better understanding of the invention, to the following description taken in conjunction with the accompanying drawings wherein:

FIGURE 1 is a plan view of an O-ring having a face thereon of low friction material embodying features of the present invention;

FIG. 2 is an enlarged sectional view of an O-ring similar to that illustrated in FIG. 1, having the outer engaging face thereof bonded to a low friction fabric;

FIG. 3 is a view of structure, similar to that illustrated in FIG. 1, with the low friction fabric secured to the inner working face thereof;

FIG. 4 is a view of structure similarly illustrated in FIG. 2, with the low friction fabric bonded to the entire face thereof;

FIG. 5 is a view of an annular sealing ring which is U-shape in cross section having the inner face thereof bonded to a fabric having low friction characteristics;

FIG. 6 is a view of structure similarly illustrated in FIG. 5 showing the fabric having low friction characteristics bonded to both faces thereof;

FIG. 7 is a view of structure similarly illustrated in FIG. 5, showing the low friction fabric material bonded to the outer face thereof;

FIG. 8 is a view of a cup-shaped seal having a low friction fabric material bonded to the outer peripheral face thereof;

FIG. 9 is a view of a V-shape type of seal having the low friction fabric material bonded to the outer engaging face thereof;

FIG. 10 is a view of a washer-like seal having the working face thereof bonded to the low friction fabric material;

FIG. 11 is a view of a cylindrical seal having a sleeve of the low friction fabric material bonded on the inner face thereof;

FIG. 12 is a view of an annular seal which is L shape in section, having on the inner working face a low friction fabric material bonded thereto;

FIG. 13 is a sectional view of a washer-like seal having the low friction fabric material bonded to the inner engaging face thereof;

FIG. 14 is a view of a seal similarly illustrated in FIG. 13, in which the body of the seal is recessed to provide more resiliency to the working face thereof;

FIG. 15 is a view of a seal similarly illustrated in FIG. 14, having the body offset to provide greater width to the working face having the low friction material bonded thereto;

FIG. 16 is a view of a seal similarly illustrated in FIG. 12, having on the engaging face thereof the low friction material;

FIG. 17 is a sectional view of a cylindrical type bearing and seal having on the entire inner face thereof a sleeve of low friction material which is bonded to the elastomeric body material;

FIG. 18 is a view of structure, similar to that illustrated in FIG. 17, with the bearing portion applied to the outer surface of a piston;

A large number of well known seals are herein illustrated by way of example, to which the low friction fabric material has been bonded in a manner embodying the present invention. While the large number of seals have shown for the purpose of disclosing the different applications, it is to be understood that such showing is not to be considered limiting since there are many other types of seals to which the present invention applies.

Figure 19:
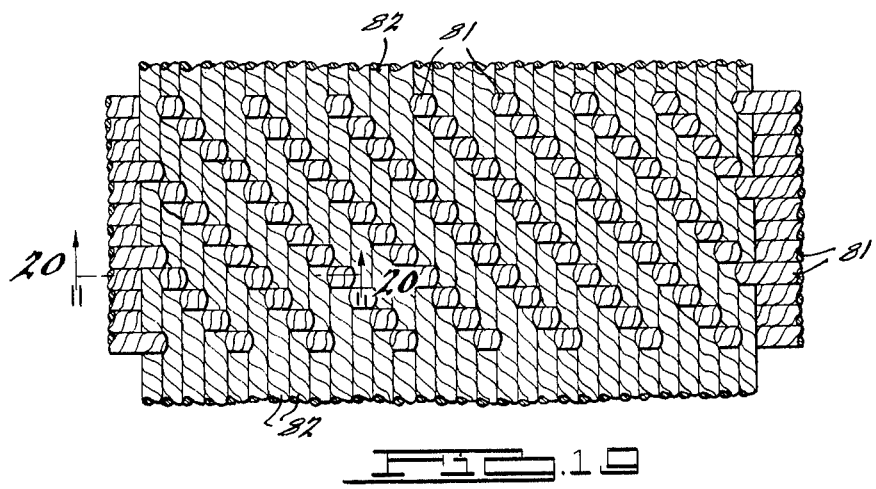
FIG. 19 is a plan view of a fabric having a face of low friction material and a face of bondable cords on opposite sides thereof.
Figure 20:
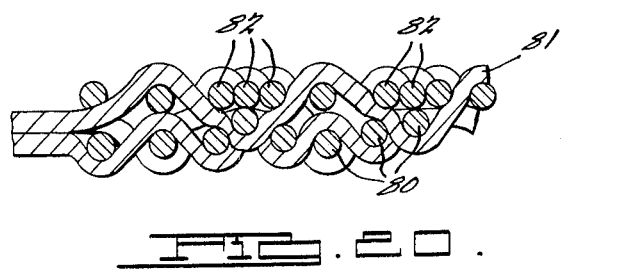
FIG. 20 is an enlarged sectional view of the structure illustrated in FIG. 19, taken on the line 20—20 thereof.

In FIGS. 1–4, O-rings are illustrated having on the working face which engages the moving surface a layer of the low friction fabric material which is bonded thereto. In FIG. 2 an O-ring 20 of the scalloped type has on the outer face a layer of woven fabric material 21 which has low friction characteristics. As pointed out hereinabove, such material may be woven from fibers of rayon, nylon, vinyl and the like resins, which are known for their comparatively low friction properties and which bond to the elastomeric body material of the O-ring or other types of seals. Such a material on the surface of the O-ring substantially increases the life thereof by reducing the friction between the O-ring and the relatively movable surface. Under low speed and low friction application, such materials operate satisfactorily; however, under high loads and high pressure conditions, the material of the fabric 21 is preferably Teflon or other fluorocarbon material having a backing of cords which bonds to the body material and which is described and claimed in the above mentioned copending application. In FIGS. 19 and 20, the fabric material has a layer of low friction fiber threads 80 forming the warp of the fabric while low friction threads 81 form the filler thereof. Bondable cords 82 are disposed parallel to the warp threads 80 and are retained by having each of the filler threads 81 pick up a bondable cord 82 at certain spaced points, herein illustrated as at every fourth cord. The next adjacent filler thread 81 picks up the next adjacent bondable cord 82 and skips three of the adjacent bondable cords before picking up the next adjacent cord 82. In this manner, the working face of the resulting material will be entirely of the low friction threads while the rear bondable face will have the greatest part thereof formed of the bondable cords 82. The bondable cords, thereof, will form anchor areas for the face of the low friction threads and the low friction threads will form a 100% nonfriction surface.

In FIG. 3 an O-ring 20 is illustrated having on the inner working face thereof a low friction fabric material 23 which is bonded to the elastomeric body material. In FIG. 4 an O-ring 24 is illustrated having the entire surface encased by a fabric sleeve of the herein defined type which embodies low friction characteristics. In such an arrangement any part of the outer surface of the O-ring may operate against a moving surface in a manner to substantially increase the life of the O-ring. It is to be understood that the low friction material bonds to the elastomeric material of the body in a manner to have the surface thereof free from the material so that the entire engaging surface has the low friction properties. Further, a flexible weave is preferably employed in the fabric or sleeve such as that employed in hosiery so that the engaging surface provided thereby is extremely flexible so that the pressure exerted by the elastomeric material of the body will in no way be affected thereby.

In FIG. 5, a seal 26 is illustrated of the U-shape type having a web 27 and an outer cylindrical flange 28 and an inner cylindrical flange 29. The sealing face of the inner flange 29 has the low friction fabric 30 bonded thereto either directly or by an adhesive material or by a backing layer secured thereto which is bonded to the flange 29. The fabric material is preferably woven in a sleeve form so as to be continuous when applied to the sealing face of the flange 29 and is preferably of an elastic weave, such as in hosiery, so that it may expand and contract with the flange 29. A similar construction is illustrated in FIG. 6 wherein the annular U-shaped seal has the woven fabric material applied to both the inner and outer faces, that is to say, on the faces of the flanges 28 and 29. In FIG. 7 a similar U-shaped type of annular seal is illustrated, wherein the outer sealing face on the flange 28 has the low friction fiber fabric material bonded thereto, as explained above.

In FIG. 8 a cup-shaped type of seal 31 is illustrated, having an annular flange 32, the outer sealing face of which has the low friction fabric material 33 bonded thereto in the manner as pointed out hereinabove, that is to say, the fabric material is preferably woven in sleeve form with a hosiery type weave so that the sleeve may expand and contract with the expansion and contraction of the flange 32.

FIG. 9 illustrates a V type of seal 34 which may be employed singly or in multiples and which has a working face on the inner or outer edges 35 and 36. Either or both of these edges has the fabric material 37 bonded thereto, the material preferably being in a woven sleeve form of a hosiery-like elastic weave to permit the face or faces to expand with the material of the seal.

In FIG. 10 a thrust washer 38 is illustrated having a washer-like body 39 to the face 40 of which a washer-like fabric 41 of low friction fiber material is bonded. The fabric may be directly bonded to the material of the washer 39 or may be woven on a bondable layer which is secured to the face of the body.

In FIG. 11 a sleeve type of seal 42 is illustrated, having a cylindrical body 43 the inner surface of which has the low friction fabric 44 secured thereto. The low friction fabric material in sleeve form preferably has an elastic hosiery type of weave so that it will not restrict the pressure exerted by the cylindrical body portion 43 of the seal and may have a bondable face, as explained above.

In FIG. 12 a washer-like seal 45 is illustrated having an inturned cylindrical lip 46 with a sleeve of fabric material 47 in fabric or compound fabric form bonded to the sealing face in a manner pointed out hereinabove. About the outer surface of the cylindrical sealing portion 46, a garter spring 48 may be applied for exerting pressure upon the body 46 and urging the low friction material 47 of the sleeve into engagement with an element being sealed thereby.

In FIG. 13 a washer-like seal 49 is illustrated having an offset sealing face 51 which has a sleeve of low friction fabric or compound fabric material 52 bonded thereto. In FIG. 14 a similar seal 53 is illustrated having a body 54 and an inner sealing face 55 against which a sleeve 56 of low friction fabric or compound fabric material is bonded. An annular groove 57 may be provided in the face of the body 54 to reduce the tension on the adjacent portion of the low friction sealing material 56. A similar seal 58 is illustrated in FIG. 15 having a sealing face 59 and a sleeve of low friction fabric or compound fabric material 61 bonded thereto. The body 58 is stepped so that the upper portion will exert less pressure on the adjacent portion of the sleeve 61.

In FIG. 16 a further form of seal is illustrated, that having the cylindrical sealing portion 62 extending from a metal ring 63 and having a sleeve of low friction fabric or compound fabric material 64 bonded to the inner sealing face thereof. The sleeve is preferably woven with an elastic hosiery weave so that it will expand to the shape of the working face and offer no resistance to the contraction or expansion of the annular sealing portion 62. For applying a pressure to the sealing portion and the low friction sleeve 64, a garter spring 65 is provided on the outer side of the sealing body.

In FIG. 17 a further form of the invention is illustrated, that wherein a cylindrical body 66 preferably of elastomeric material forming a bearing has a seal portion 67 on one end which is reduced in thickness and which has pressure applied thereto by an annular garter spring 68. The sealing surface on the portion 67 and the bearing portion 66 has a sleeve 69 of low friction woven material bonded to the inner face thereof. The sleeve is preferably woven with an elastic hosiery weave so that it may cover the faces of the seal and bearing and permit the seal and bearing portions to contract into bearing and sealing relation to a rod or shaft extending therethrough. Not only is a seal provided at one end of the bearing but the bearing portion itself permits vibration and a slight play of the shaft portion engaged thereby while providing a desirable bearing engagement with the surface thereof.

Referring to FIG. 18, a further embodiment of the present invention is illustrated, that provided by applying the low friction material to the outer surface of a piston. A piston 71 has a sleeve 72 of elastomeric material secured thereto, with the outer surface 73 of the low friction fiber material. The elastomeric material may be in solid cylindrical form, eliminating the piston 71, or the piston may have the low friction fiber material 73 directly secured thereto. The elastomeric material permits slight misalignment of the rod and cylinder and provides lateral pressure to form a desirable seal with the cylinder surface. It is to be understood that a seal face may be provided on one or both ends of the sleeve 72 similar to the seal 67 on the bearing 66 of FIG. 17 or such seal faces may be omitted from both of the embodiments.

Various types of seals have been illustrated and described herein to show the different applications of the low friction fabric material to the sealing faces of the seals and the face of the bearing and piston having the elastomeric body. It has been clearly pointed out that the fabric material has low friction characteristics and is secured to the sealing face of the seal and also on the face of the bearing. In certain instances the fibers of the fabric will directly bond to the material or may be supported by cords or fibers which will bond thereto. The weave of the fabric when employed on the elastomeric body material is preferably of the flexible hosiery type so that it offers no resistance to the pressure exerted by the elastomeric material. Preferably the weave is uniform in all directions but when providing a unidirectional structure the unidirectional position of the weave follows the direction of the movement of the element which is sealed to provide the best low friction engagement therebetween.

The application of the tetrafluoroethylene material to the entire surface of the seal, bearing, piston and the like, as illustrated in FIG. 4, may be made to any type of seal, bearing or piston, those herein illustrated and others on which such materials may be applied. By enclosing the articles with the tightly woven tetrafluoroethylene material which withstands high temperatures, the body material will be retained within the woven fiber material even though it should soften under heat. In a large number of cases, when the body material has again cooled, it will assume its original shape and be as effective as before to perform as originally intended. Since the tetrafluoroethylene material is substantially insoluble, the seals, bearings and pistons enclosed by the tightly woven fibers thereof will prevent any fluids or other materials from contacting the body material which will not be harmed in the pressure of such fluids or other materials. Therefore, when the seals, bearings and pistons have the body material completely enclosed by the tetrafluoroethylene fabric material, the seals, pistons and bearings will be substantially indestructible when operated in the presence of fluids or materials which would damage the body material. It is, therefore, to be understood that the application of the fabric to the surface of the O-ring, as illustrated in FIG. 4, is not to be considered limiting but such application can be made to all seals, pistons and bearings, those herein illustrated as well as others known in the art. The elastomeric material of the body is inserted within the enclosing fabric of tetrafluoroethylene material by needles which are punched through the layer of the fabric into the interior thereof. A predetermined amount of elastomeric material is injected into the interior encompassing fabric and thereafter the material and fabric are molded to a desired form in any known manner, such as in a set of dies.

What is claimed is:

An article of manufacture comprising a metal body having a surface covered with a layer of elastomeric material, and an annular layer of fabric material covering said layer of elastomeric material, said fabric material having at least its exposed surface formed of polytetrafluoroethylene fibers and having an expansible weave so as to expand and contract radially to maintain said fibers in snug mated low friction slidable engagement with the surface of another member.

References Cited by the Examiner
UNITED STATES PATENTS

| | | | |
|---|---|---|---|
| Re. 23,782 | 2/1954 | Patterson | 277—235 |
| 529,831 | 11/1894 | Peckham et al. | 277—234 |
| 2,255,504 | 9/1941 | Current | 277—233 |
| 2,765,023 | 10/1956 | Fagg et al. | |
| 2,797,929 | 7/1957 | Herbenar. | |
| 2,846,251 | 8/1958 | Herbenar. | |
| 2,906,552 | 9/1959 | White | 277—228 |

DON A. WAITE, *Primary Examiner.*

EDWARD V. BENHAM, ROBERT C. RIORDON,
*Examiners.*